April 17, 1928.  
E. MANNING  
DRIP VALVE  
Filed Dec. 29, 1926.  
1,666,243

Inventor  
Edward Manning

Patented Apr. 17, 1928.

1,666,243

UNITED STATES PATENT OFFICE.

EDWARD MANNING, OF RUTLAND, VERMONT, ASSIGNOR TO MANNING MANUFACTURING COMPANY, OF RUTLAND, VERMONT.

DRIP VALVE.

Application filed December 29, 1926. Serial No. 157,835.

This invention relates to improvements in drip valves for sterilizers, particularly adapted for use in machines for the Pasteurization of milk.

An object of this invention is to provide a drip valve which may be combined with a main valve, in such a manner that when closing the main valve the drip valve will open, and when opening the main valve the drip valve will function to close.

A further object of this invention is to provide a milk detector or drip which will function to work in conjunction with the main valve in a Pasteurizer, wherein the main valve functions to close off the supply of milk from the Pasteurizer; but in ordinary practice, a slight leakage occurs during the period of Pasteurization and this leakage or drip ordinarily flows into the Pasteurized product, which is objectionable for many reasons. The drip valve, according to this invention, provides an efficient means for eliminating the leakage problem.

Another object of this invention is to provide a valve device especially adapted for use on apparatus employed in the milk industry, including Pasteurizers, although it may be used also for a number of other purposes where valves or drips are common.

This invention provides a combination of a main valve having a stem and means connected with the stem for opening and closing the main valve, a drip valve, and automatic means for opening the drip valve when closing the main valve and closing the drip valve when opening the main valve, consisting of a suitable connecting element between the stem and the drip valve.

A further object of this invention is to provide means for sterilizing the valve mechanism by means of a steam line suitably connected to the valve mechanism in such a manner that when the drip valve is open the steam will circulate through the valve mechanism at the same time the drip or leakage will be allowed to flow into a suitable sanitary pipe line, the line being properly closed by means of sanitary fittings.

Another object of this invention is to provide a valve mechanism which may be connected to the Pasteurizer without necessitating objectionable crevices or curves formed in the lining of the Pasteurizer.

Other objects of this invention will appear from the following detailed description of the device, and as disclosed in the single sheet of drawings which is herewith made a part of this application.

Figure 1:
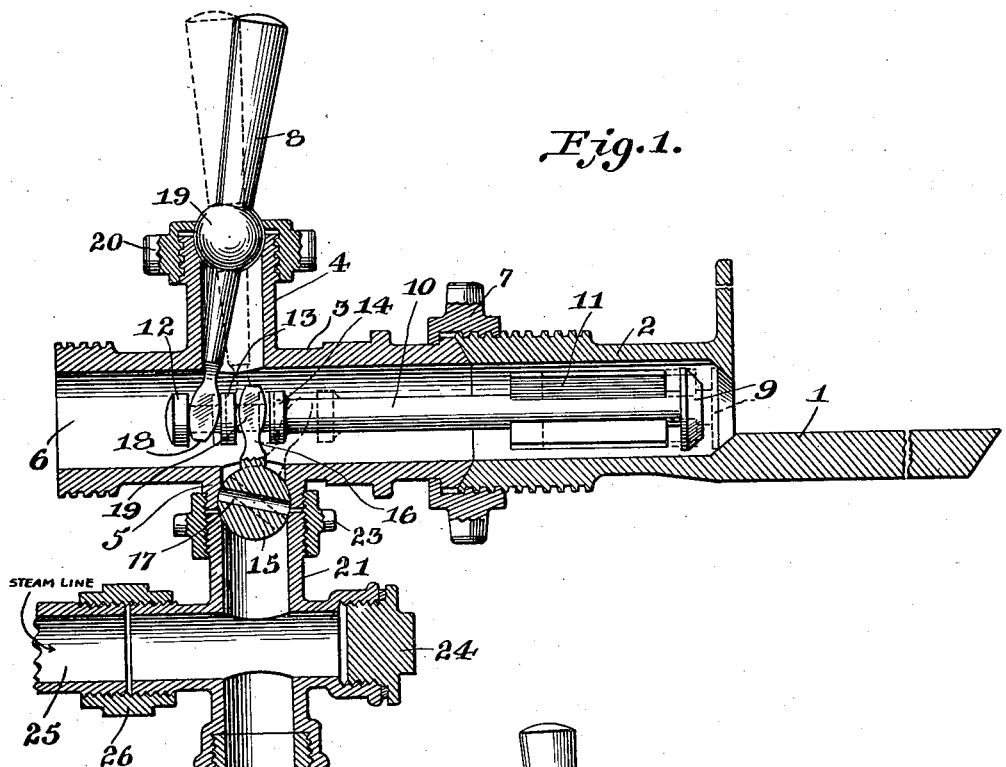
Figure 1 illustrates a sectional, vertical view of the main valve, drip valve and steam lines in assembled relationship with the Pasteurizer, showing the main valve open and the drip valve closed.
Figure 2:
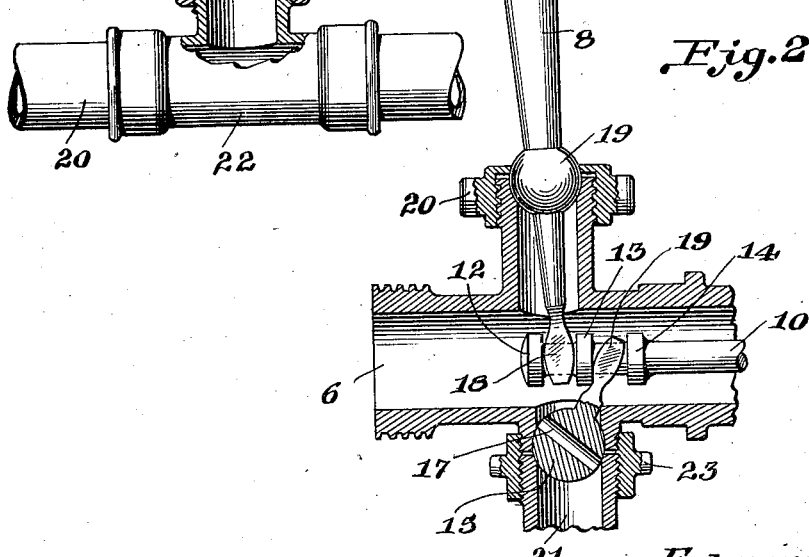
Figure 2 represents a vertical, sectional view of a portion of Figure 1, with a section broken away, disclosing the drip valve in open position.

Numeral 1 designates the Pasteurizer, while the casing of the main valve, which is adapted to be connected to the Pasteurizer 1, may comprise a plurality of sections made of suitable material such as designated by the numerals 2 and 3. Extending laterally from the casing element 3 are tubular portions 4 and 5 in open communication with the hollow portion 6 of the casings 3 and 2. The sections 2 and 3 of the casing may be joined together by means of a wing nut 7 or any other suitable element. The laterally extending tubular portion 4 is adapted to have positioned therein an operating lever 8. Within the casing is adapted to be slidably positioned a main valve element 9 having attached thereto a stem 10. Fin members 11 are preferably integrally attached to the upper periphery of the valve stem 10, the fin members 11 functioning to fit within the casing and to support and steady the valve stem in its movement therein. One end of the valve stem 10 is provided with a plurality of spaced lug members 12, 13 and 14. The operating handle 8 is adapted to open and close the main valve portion 9 and extends inwardly of the casing to loosely cooperate with the stem 10 at a point between the outermost lug portions 12 and 13. A drip valve element 15 is positioned in the valve casing extension 5 having a suitable stem portion 16 extending therefrom, the inner end of the stem portion 16 being adapted to cooperate with the main valve stem 10 between the spaced lug portions 13 and 14. The drip valve element 15 is provided with an opening 17 positioned in such a manner in the element 15 that when the main valve operating handle 8 is moved for opening the main valve 9, the drip valve 15 will assume the closed position shown in Figure 1, and when the operating lever 8 functions to close the valve 9, the drip valve 16 and its opening 17 will assume the open position disclosed in Figure 2. The open position for the drip valve is also clearly shown in broken lines in Figure 1, as well as the closed position of the main valve 9. The operating handle 8 may be of any suitable type, the modification as disclosed in this application having forked elements 18 adapted to pass around the valve stem 10 between the lug elements 12 and 13. A spherical portion 19 is positioned intermediate the ends of the operating lever 8 for the purpose of providing universal movement to the lever arm 8. The spherical portion 19 is adapted to be supported in a suitable seat formed in the outer end of the laterally extending tubular portion 4 and held in rotatable position by means of a wing nut element 20. The inner end of the lever portion 16 extending from the drip valve 15 is adapted to be provided with forked elements 19' for the purpose of loosely cooperating with the stem 10 between the lug portions 13 and 14. When the main valve is closed as disclosed in broken lines in Figure 1 and the drip valve is open as disclosed in Figure 2, the leakage through the valve 9 from the Pasteurizer 1 will drip through the opening 17 into receiving elements, preferably in this invention consisting of sanitary pipe line sections 20' which may be suitably connected to the laterally extending portion 5 from the valve casing element 3 by means of sanitary pipe line fittings 21, 22, 23 and 24. The fitting 21 is preferably connected in open communication with a steam line 25 by means of a suitable coupling 26 in such a manner that when the drip valve 15 is open as disclosed in Figure 2 and in broken lines in Figure 1, the steam will circulate through the opening 17 in the drip valve into the main valve casing portion 6, thereby functioning to sterilize the entire valve mechanism by reason of the fact that the sanitary pipe line connection 20' and 22, which functions to catch the drip, is suitably closed along its line for that purpose. The steam entering through the line 25 will circulate throughout the main valve portion including the sanitary pipe line leading therefrom.

In operation, this invention provides a drip valve device in combination with a steam sterilizing system, which may be readily adapted for use in connection with the milk Pasteurizer. When the valve 9 is in open position as disclosed in Figure 1, the drip valve 15 will be closed and the milk will flow from the Pasteurizer through the hollow portion 6 in the valve casing. When the valve 9 is closed as clearly shown in broken lines in Figure 1, the drip is open and the leakage flows through the opening 17 into the sanitary receiving lines 20' and 22 at the same time the steam circulates freely throughout the pipe lines and the entire valve mechanism, thereby functioning to thoroughly sterilize the device.

This invention provides a milk detector or drip valve which will work in conjunction with the main valve, the drip valve cooperating with the main valve stem in such a manner as to act automatically with the movement of the valve stem.

It is to be understood that the device as disclosed and described in the above specification is but one modification of the invention. Substitutions and alterations may be made in the disclosure within the scope of the claims without affecting the merits of the invention.

What I claim is:

1. In a device of the character described, a main valve having a casing and a stem, an operating lever connected with the stem for opening and closing the valve, a drip valve in the casing connected with the stem in such a manner that when the operating lever moves to open the main valve, the drip valve will close and vice versa, means for sterilizing the valve mechanism when the main valve is closed, and the drip valve is open.

2. In a device of the character described, a main valve having a casing and a stem, an operating lever connected with the stem for opening and closing the valve, a drip valve in the casing connected with the stem in such a manner that when the operating lever moves to open the main valve, the drip valve will close and vice versa, means for sterilizing the valve mechanism when the main valve is closed, and the drip valve is open, consisting of a steam line connected in open communication with the drip valve.

In testimony whereof I affix my signature.

EDWARD MANNING.